US008798316B2

(12) United States Patent
Berkvens (10) Patent No.: US 8,798,316 B2
(45) Date of Patent: Aug. 5, 2014

(54) METHOD AND SYSTEM FOR CONTROLLING LIGHTING (75) Inventor: Winfried Antonius Henricus Berkvens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/320,275

(22) PCT Filed: May 12, 2010

(86) PCT No.: PCT/IB2010/052110
§ 371 (c)(1),
(2), (4) Date: Nov. 14, 2011

(87) PCT Pub. No.: WO2010/131212
PCT Pub. Date: Nov. 18, 2010

(65) Prior Publication Data
US 2012/0057755 A1 Mar. 8, 2012

(30) Foreign Application Priority Data

May 14, 2009 (EP) ..................................... 09160198

(51) Int. Cl.
*G06K 9/00* (2006.01)
*H05B 37/02* (2006.01)

(52) U.S. Cl.
CPC .......... *H05B 37/029* (2013.01); *H05B 37/0227* (2013.01)
USPC ........................................................ 382/103

(58) Field of Classification Search
None
See application file for complete search history.

(56) References Cited

U.S. PATENT DOCUMENTS

| 6,775,014 | B2 | 8/2004 | Foote et al. |
| 7,006,950 | B1* | 2/2006 | Greiffenhagen et al. ......... 703/2 |
| 2006/0050499 | A1* | 3/2006 | Yoneda et al. .................. 362/11 |
| 2006/0071605 | A1* | 4/2006 | Diederiks ....................... 315/76 |
| 2006/0145824 | A1 | 7/2006 | Frenzel et al. |
| 2010/0208039 | A1* | 8/2010 | Stettner .......................... 348/49 |

FOREIGN PATENT DOCUMENTS

| DE | 3538103 A1 | 4/1987 |
| DE | 102007057757 A1 | 6/2008 |
| JP | 10027505 A | 1/1998 |
| JP | 11251074 A | 9/1999 |
| JP | 2002048643 A | 2/2002 |

(Continued)

*Primary Examiner* — Nirav G Patel
(74) *Attorney, Agent, or Firm* — Yuliya Mathis (57) ABSTRACT

A method is provided to control the lighting ambience in a space by means of a plurality of controllable light sources (16). The light from the light sources (16) is adapted dependent on a position of an object (20) such as a person in the space. Control comprises capturing an image of at least part of said space. From said image whether light from a selected one of the controllable light sources (16) to points in said space shown at respective image positions in said image has been intercepted by the object (20). This may involve image positions where the object casts a shadow or positions that show a surface on the object that is turned away from the light source (16). From the respective image positions where the light has been detected to be intercepted information indicative of a direction of the intercepting object relative to the selected one of the controllable light sources (16) is detected. Position information that indicates a position of the object (20) in said space is updated according to the direction determined from the respective image positions where the light has been detected to be intercepted. A lighting parameter setting of the controllable light sources (16) is adjusted dependent on the updated position information.

13 Claims, 7 Drawing Sheets

(56) References Cited

FOREIGN PATENT DOCUMENTS

| | | |
|---|---|---|
| JP | 2006148357 A | 6/2006 |
| JP | 2007133669 A | 5/2007 |
| JP | 2008304104 A | 12/2008 |
| WO | 2007072285 A1 | 6/2007 |
| WO | 2007110791 A1 | 10/2007 |
| WO | 2008047281 A2 | 4/2008 |
| WO | 2009130521 A1 | 10/2009 |

* cited by examiner

METHOD AND SYSTEM FOR CONTROLLING LIGHTING

FIELD OF INVENTION

The invention relates to a method for controlling lighting, system for controlling lighting, an image processing device, and a computer program product.

BACKGROUND

From WO2007072285 it is known to control lighting in a room dependent on the position of furniture. Dependence on furniture position may be a factor in a lighting system that controls the spatial distribution of light intensity and spectral properties in the room, which will be called a "light ambience". A selected light ambience may be realized by means of a plurality of light sources at different points in the room and with selectable intensity and spectral content. Selection of a desired light ambience may be performed for example based on activities of users, such as watching television, conversation, reading etc. When a user watches a display screen for example, different light ambience selections may be made dependent on a classification of the content of the displayed information (romantic film, action film, video game etc.) or different light ambiences may be created based on the presented video frames using video content analysis or using light scripts dedicated to the content. Also, a user may manually control the ambience selection, usually by selection from preset options.

As a light ambience may involve many individual lighting parameters it is desirable that these parameters can be largely adjusted automatically, without requiring a user to set all parameters each time. However, such an automatic selection presents a challenge because it depends on the position of furniture in the room as well as the user's position and direction of attention. Furniture and persons can block light or affect the spectral distribution of reflected light. Moreover, different lighting parameters may be needed dependent on the user's position and direction of attention. For example lighting parameters may need to be controlled differently dependent on whether the corresponding light source is in front of the user, behind the user or on a side of the user.

To account for the effects of furniture and persons in the room WO2007072285 provides for the use of RFID tags attached to the furniture and the person's clothing. In this way the positions and identities of various objects can be determined by means of triangulation of RFID responses and the results can be used to adapt the control of the light sources. WO2007072285 also describes that instead of RFID tags other sensors may be used that are capable of receiving signals and transmitting information, such as infrared or ultrasonic transducers. However, to account for all lighting effects, this solution requires the overhead of providing all furniture and persons with transponders. As an alternative one may consider measuring the position of objects and persons by means of image processing techniques. Stereoscopy, or more abstractly identification of multiple light rays that impinge on objects and persons in the room, can be used to measure positions. However, such measurements require a calibrated setup, which may be impracticable in non-professional environments, like a home.

SUMMARY

Among others, it is desirable to provide for a method and system for controlling a light ambience which is able to take into account, automatically, of the position of a person or other object without requiring substantial overhead such as detailed calibration.

A method according to claim 1 is provided. Herein an image is captured of at least part of the space lighted by the light sources that are used to create the light ambience. From said image an image processor detects whether light from a selected one of the controllable light sources to points in said space shown at respective image positions in said image has been intercepted by the person or other object. These may be image positions where the person or other object casts a shadow on other objects or image positions on the person or other object that face away from the controllable light source for example. In an embodiment the respective image positions are selected only from a predetermined set of image positions, such as image positions that have been detected to show a person or other object, or image positions that have been detected to be lighted by the selected one of the controllable light sources absent the person or other object, or where the selected one of the controllable light sources is predicted to dominate lighting absent the person or other object.

From the image positions where the light has been detected to be intercepted, a processor determines information that indicates a direction of the intercepting person or other object relative to the selected one of the controllable light sources from the respective image positions where the light has been detected to be intercepted. A line from image positions where the person or other object has been found to cast a shadow to an image position of the selected one of the light sources may be used to determine the direction for example. As another example the distribution of parts on the person or other object that are illuminated and not-illuminated by the selected one of the controllable light sources may be used to determine the direction.

In an embodiment, the controllable light source to be used for the determination of the direction is automatically selected from the available controllable light sources, dependent on a determination that light from that controllable light source is seen to be intercepted at the image positions used for the determining the information.

The direction that is obtained is used by a processor to update position information that indicates a position of the person or other object in said space. Updating may for example comprise narrowing down the number of areas in a room in which a person or other object may be present. Updating may start for example from a set of all possible initial positions, or from a set that has already been narrowed down by updates derived from earlier images, updates derived with other ones of the controllable light sources, or derived with other techniques, such as detection of the person or other object in the image.

The resulting position information is used to automatically adjust a lighting parameter setting of the controllable light sources. In this way it is possible to adjust lighting parameters of all controllable light sources that are used to create the light ambience using observations of shadow effects due to selected ones of the controllable light sources. Even controllable light sources that have not been used to determine the position information can be controlled in this way, if they have a known geometrical relation with the light sources that are used to determine the position information. In an embodiment the adjustment of lighting comprises receiving a selection of a desired light ambience, which specifies light properties dependent on direction relative to the person or other object. Different selectable light ambiences may have different distributions of light intensity and spectral content, or even temporal variation of these distributions. The selected ambience is then automatically translated into a setting of lighting parameters of the controllable light sources according to the updated position information.

In an embodiment, the parameter adjustment is controlled by information about the direction that indicates only whether the person or object is beyond a predetermined angle, independent of how far the person or object is beyond the predetermined angle. This makes accurate information about the position of light sources and objects in the room unnecessary for the control.

Although an embodiment may be used wherein a relatively accurate direction measurement is provided, almost pinpointing the position of a person, it should be appreciated that such accuracy may not be necessary. In an embodiment, a very coarse measurement may be used, which provides no more information than that the person is to the left or right of the selected one of the controllable light sources because the shadow from the person has a direction component running to the left or right respectively in the image, and/or that the person is in front of or behind the selected one of the controllable light sources because the shadow has a direction component away from the camera or towards the camera. This type of information can be used to reduce the area in the floor plan in which the position of the person can lie. Such a reduction by itself may provide sufficient information for the purpose of lighting control, or it may be combined with results for other selected ones of the controllable light sources to provide sufficient information.

In an embodiment the position information may represent presence or absence of the person or other object in a predetermined set of areas of a floor plan, the areas having boundary lines that radiate from positions of the controllable light sources in the floor plan. When such areas are used it is easy to apply the information about direction from selected ones of the light sources to updates of position information. The updates may be used for example to exclude the presence of the person or other object in areas in directions that are not consistent with the observed shadows.

In an embodiment the respective image positions are selected only from image positions that show a floor, a ceiling and/or a wall of said space. Known image segmentation techniques may be used to identify such image positions beforehand.

In an embodiment differences between images obtained with different lighting parameter settings are used to detect pixel positions that show points in said space where light has been intercepted by the person or other object. When the selected light ambience defines a pattern of temporal variation, the detection may be synchronized to this variation to perform such detection without changing lighting only for the purpose of detection.

In an embodiment the detection of pixel positions that show points in said space where light has been intercepted by the person or other object is performed by comparing pixel values from the image with reference values for the respective pixel positions. The comparison may be performed directly or by dividing pixel values by the reference values and comparison of the ratio with a predetermined threshold. In a further embodiment the reference values are computed from the setting of the lighting parameters of the controllable light sources at the time of capturing the image. The reference values may be adapted to the selected one of the controllable light sources. This makes it possible to obtain more reliable detection even without varying lighting parameters.

The method may be implemented using a lighting system that comprises an image processing circuit with an input for receiving images from an image sensor, and an output for supplying the position information to the control circuit, the processing circuit being configured to detect in an image from said image sensor whether light from a selected one of the controllable light sources to points shown at respective image positions in said image has been temporarily intercepted by an object, to determine information indicative of a direction of the intercepting object relative to the selected one of the controllable light sources from the respective image positions where the light has been detected to be intercepted, and to update the position information according to the direction determined from the respective image positions where the light has been detected to be intercepted.

BRIEF DESCRIPTION OF THE DRAWING

Exemplary embodiments will be described using the following figures

DETAILED DESCRIPTION OF EXEMPLARY EMBODIMENTS

Figure 1:
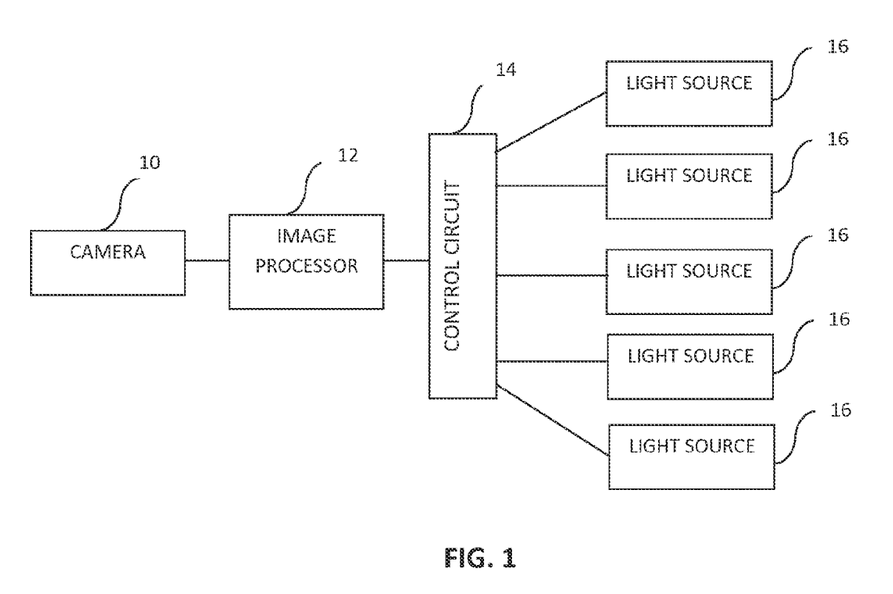
FIG. 1 shows a lighting system

FIG. 1 shows a lighting system comprising a camera 10, an image processor 12, a control circuit 14 and a plurality of controllable light sources 16. Image processor 12 has an input coupled to camera 10 and a communication interface coupled to control circuit 14. Control circuit 14 has outputs coupled to control inputs of controllable light sources 16. Part or all of controllable light sources 16 may provide for on/off control, intensity control, directional control and/or control of spectral content. In an operational setting, controllable light sources 16 are located at various positions in a room.

In operation, control circuit 14 controls a setting of controllable light sources 16, that is, control circuit 14 controls which combination of controllable light sources 16 is on and optionally with what intensity, spectral content and/or directional distribution. In an embodiment the setting may be time independent at least for some time interval, but alternatively a setting with a temporally varying pattern of intensity and/or spectral content variation of selected controllable light sources 16 may be used, with predetermined repetition period.

Control circuit 14 is configured to select the setting dependent on a light ambience selection and position information that is provided by image processor 12. Preferably control circuit 14 has an input for receiving the light ambience selection, but alternatively a single predetermined light ambience selection may be provided for. The input for receiving the light ambience selection may comprise a user interface configured to allow the user to choose one of a plurality of alternative light ambience selections. Preferably, the position information at least approximately indicates the position of a person in the room, but alternatively or in addition, the position of other types of object may be determined and used to control lighting.

In addition a display screen (not shown) may be provided in the room, coupled to a video source such as a television receiver or media player (not shown) or a game computer (computer) or other source of display images. In this case the video source, game computer or the like may have an output coupled to the input for receiving the light ambience selection, dependent on a video content indication a game state or the like. Camera 10 may be mounted on the display screen.

As mentioned control circuit 14 may need to select the setting of controllable light sources 16 dependent on information about the position of a person or other object in the room. By way of example embodiments for determining the position of a person will be described. The light ambience selection may define light intensity and/or spectral content and/or patterns of temporal variation of light intensity and/or spectral content from different angles relative to the person. Thus for example, a light ambience selection may provide for more light intensity from aside the person than from behind and in front of the person, or for more reddish light from behind than from aside. Another light ambience selection may provide for more light intensity from below than from above, or for more greenish light from up front than from above. Yet another light ambience selection may require a light intensity from a certain angle range relative to the person that peaks as a function of time at a selected time point.

Figure 2A:
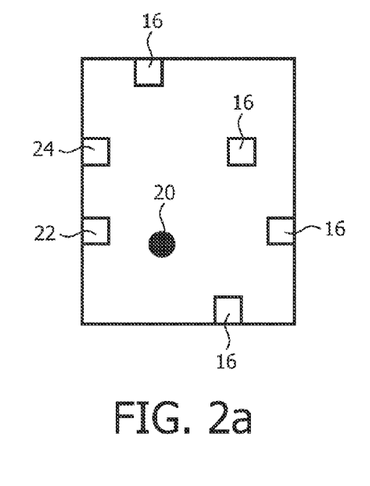
FIG. 2 shows a lighting configuration
Figure 2B:
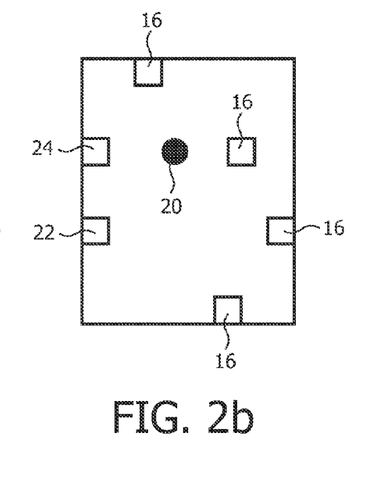

As will be appreciated, the distribution of control signals to the controllable light sources 16 needed to implement such light ambience selections depend on the position of the person 20. FIGS. 2a,b illustrate this by showing top views of a room with a person 20 and a plurality of controllable light sources 16, 22, 24. A controllable light source 22 that is in a lateral direction from the person 20 when the person is at one position may be located in a direction in front of the person at or behind the person 20 when the person 20 is at other positions. A different controllable light source 24 may be in a lateral direction from the person 20 in that case. Accordingly, when the light ambience selection calls for a certain light intensity and/or spectral content from a lateral direction, different controllable light sources 22, 24 may be needed to provide for this light intensity and/or spectral content dependent on the position of person 20. Control circuit 14 is configured to adapt the control signals accordingly.

Image processor 12 provides the information about the position of a person in the room. Image processor 12 uses detection of patterns of light and shadow, i.e. direct illumination and absence of direct illumination by an individual light source. Light and shadow observed on a person may be used, and/or shadows cast by the person on other objects.

Figure 3:
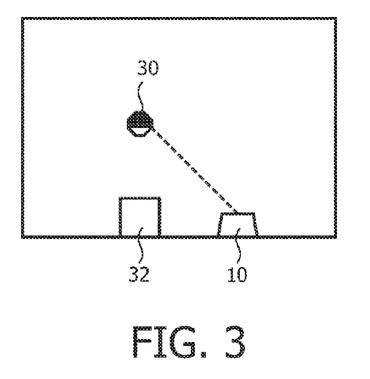
FIG. 3 illustrates shadows on persons

In the absence of obstacles between a light source and a person, the light source directly illuminates only one side of a person. Roughly one half of the person will be directly illuminated. FIG. 3 illustrates the effect on the images from camera 10 by means of a top-view of a room. When a light source 32 is to the left of camera 10 a part on the left side of person 30 is seen to be directly illuminated in the image from camera 10. The ratio between image areas that show directly illuminated parts and not directly illuminated parts on the person varies as a function of the person's position from left to right. Furthermore, the intensity of light from illuminated parts diminishes towards the edge between the illuminated and not-illuminated parts. A similar effect holds for relative positions above and below.

Figure 4:
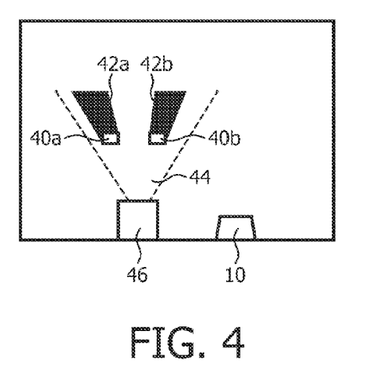
FIG. 4 illustrates shadows cast by persons

Furthermore, the person casts a shadow. This is illustrated in FIG. 4, for a point light source 46. A person 40a blocks out a cone of light 42a from the larger light cone 44 from light source 46. The blocked cone 42a, or at least the edge between the blocked cone 42a and the larger light cone 44, is visible in images from the camera 10 at positions where it intersects objects in the room. The direction of the blocked cone 42a depends on the position of the person. An example is shown wherein persons 40a, b at different positions produce blocked cones 42a,b in different directions.

In an embodiment image processor 12 is configured to use detection of patterns of direct illumination and absence of direct illumination by an individual light source due to shadows cast by a person to obtain the information about the position of a person in the room for use to control controllable light sources 16.

Figure 5:
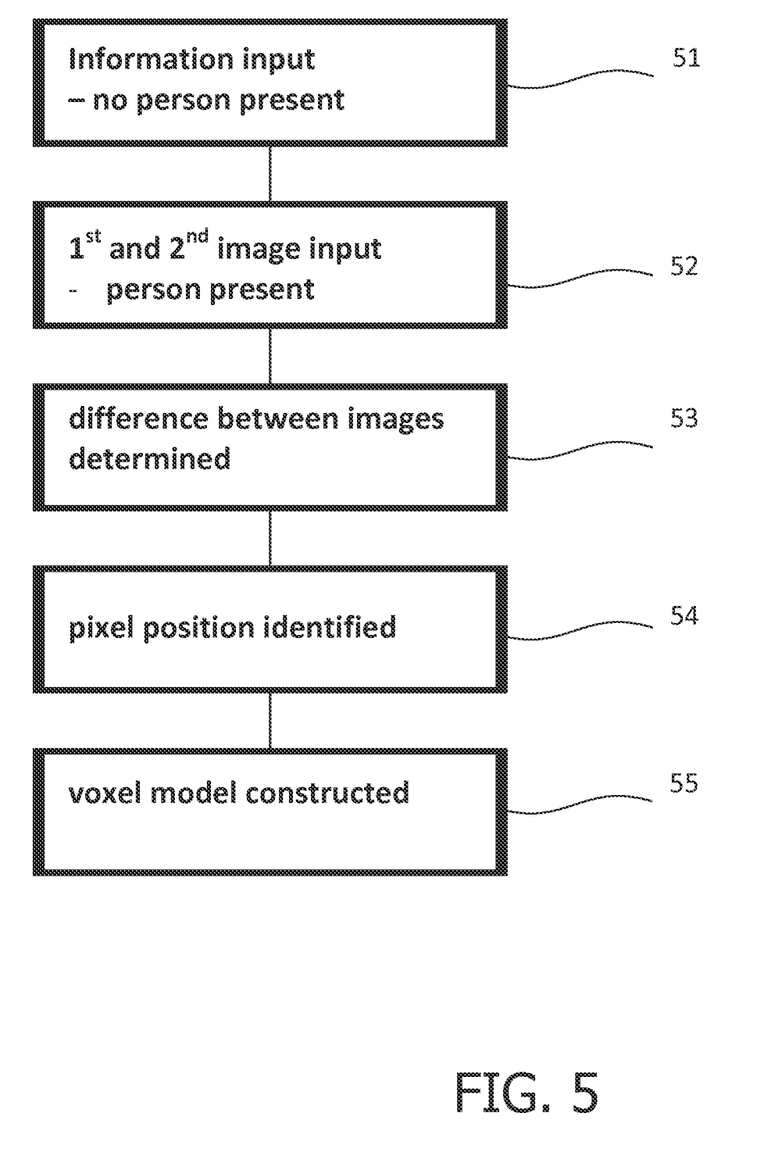
FIG. 5 shows a process for controlling lighting based on shadows

FIG. 5 will be used to describe a method to do so. For reference, a method will first be described that assumes that complete information is available. Subsequently it will be demonstrated how part of this information can be made unnecessary. In a first step 51, information about the room absent any person is input into image processor 12. In principle this information may define for each pixel position in images from camera 10 the three dimensional coordinates of an object point visible at that pixel position and the response functions to light from respective ones of the controllable light sources 16. These response functions may have simple yes/no values, indicating whether the relevant controllable light source 16 illuminates the object point or not. Alternatively, the response functions may be expressed as a ratio between pixel light intensity and intensity of the controllable light source 16, optionally as a function of wavelength or as a function of a spectral distribution control parameter of the controllable light source 16. As another alternative the response functions may have simple yes/no values, indicating whether this ratio exceeds a predetermined threshold value.

In a second step 52 image processor 12 may input a first and second image while a person is present with a selected one of the controllable light sources 16 at mutually different control settings while the first and second image is input respectively, the other controllable light source 16 having the same setting for both images. In a third step 53 image processor 12 determines the difference between the images to isolate the effect of the selected one of the controllable light sources 16. In a fourth step 54 image processor 12 identifies pixel positions of a first type on which no effect from the selected one of the controllable light sources 16 has been isolated, although these pixel positions have been recorded to respond to the selected one of the controllable light sources 16 absent the person. In addition pixel image processor 12 identifies positions of a second type on which an effect from the selected one of the controllable light sources 16 has been isolated, these pixel positions having been recorded to respond to the selected one of the controllable light sources 16 absent the person.

The three dimensional coordinates of the object points define lines from the selected one of the controllable light sources 16 to the object points. For pixel positions of the first type the images indicate that the person is present somewhere along the corresponding line. For pixel positions of the second type the images indicate that the person is not present somewhere along the corresponding line. In a fifth step 55 image processor 12 may record this in voxels of a model of the room. By repeating this for a plurality of different selected ones of the controllable light sources 16, image processor 12 identifies voxels that lie on no lines where no person is present and at least on one line where a person is present. Image processor 12 may supply an average position of those voxel locations or a position of a cluster of such voxel locations to control circuit 14 for controlling the parameters of the controllable light sources 16. It may be noted that the selected ones of the light sources 16 that were used to determine the position can be controlled in this way, but that in addition other ones of the light sources 16 may be controlled as well.

Additionally, image processor may detect pixel positions where the person is visible in an image from camera 10.

Techniques for performing such a detection are known per se. The ray paths ending at these pixel positions may be used to define further lines along which the person is present and lines along which the person is not present, which can be used to construct the voxel model in fifth step 55.

A number of requirements of this idealized method may be relaxed without significantly affecting the performance quality of the lighting system. For example, the use of pixel positions may be limited to pixels that are known to show a substantially horizontal surface, such as the floor. A group with at least part of these pixel positions can easily be determined without requiring accurate calibration. Hence the first step of the method can be considerably simplified if only such a group of pixel positions is used in the fourth step. As another example, the use of pixel positions may be limited to a group of pixel positions that are known to show a substantially vertical surface, such as a wall, or the pixel positions could be limited to respective groups that show substantially horizontal and vertical surfaces respectively. The number of groups could be limited to no more than six for example (a floor, four walls and a ceiling).

When image processor 12 uses only shadows cast on a group of pixel locations on such a surface of known orientation, a direction from the person towards the light source may be inferred directly from the direction in which the shadow extends from the person on those pixel locations in the image. In geometric terms a modeled person may be thought of as a vertical line for this purpose, so that the shadows are cast in a shadow plane through that line and the selected one of the controllable light sources 16. Then the shadow on a known plane surface visible at a group of pixel positions is the intersecting line of the shadow plane and the known plane surface. In the images from camera 10 a projection of the intersecting line arises. Given the relative geometry of the camera and the known plane surface, the projection is related one to one to the intersecting line and from this the direction of the shadow plane follows by a one to one relation. Thus, the direction in which the shadow extends in the image can be translated in a direction from the selected one of the light sources 16. In an embodiment, this is used by replacing fifth step 55 by a step that determines a direction of the shadow from a selected group of pixel positions.

Even if the position and/or orientation of the plane surface relative to the camera is not exactly known, some information about the position of the person may be obtained. For example if the shadow is on the left of the person, it will be known that the person is somewhere to the left of the selected one of the controllable light sources, in a left-right direction defined by the camera. Accordingly fifth step 55 may be replaced by a step that determines a range of directions of the shadow from a selected group of pixel positions.

In addition the requirements on information about the positions of controllable light sources in first step 51 may be reduced.

Optionally, the determination in fifth step 55 may make use of a position of the selected one of the controllable light sources 16 in terms of image coordinates (of course these image coordinates may represent a position outside the actual image: the coordinates merely define the position in a larger image plane). A fitting process may be used to select a line through the image position of the selected one of the controllable light sources 16 that best fits to the observed pixels positions from the group that have been detected to lie in the shadow, or pixel positions at that have been detected to lie at edges between illuminated pixels and shadow pixels.

From the direction of the shadow that is thus computed a spatial direction of the person from the light source is determined. A projection of this direction onto the horizontal plane may be determined for example. By applying this to at least two selected ones of the controllable light sources 16 image processor 12 can estimate a position of the person and the estimated position may be supplied to control circuit 14, to control the lighting parameters. It may be noted that the selected ones of the light sources 16 that were used to determine the position can be controlled in this way, but that in addition other ones of the light sources 16 may be controlled as well. Because the real shadow is notionally reduced to a line by this method, the resulting position is necessarily only an approximation, but an approximation suffices for the control of the lighting parameters.

In an embodiment only an approximate representation of the position of the person is used, or information that merely limits possible positions of the person to a part of the floor plan or a part of the possible heights. For control of the lighting system it suffices that such an approximate representation has sufficient accuracy to arrive at decisions about the lighting parameters. For example in an embodiment the lighting parameters may be controlled dependent on whether the person is beyond a certain distance from the camera or not, without using information about how far the person is beyond this distance or in front of this distance. Similarly, in an embodiment lighting parameters may be controlled dependent on whether the person is to the left of a certain direction from a light source or not, or dependent on whether the face of the person is above a certain height from the floor or not. In general terms, an embodiment is provided wherein control circuit 16 is configured to control lighting parameters dependent on information that indicates that the person, or other object, is detected to beyond a line in a predetermined direction independent of how far beyond. In this embodiment, image processor 12 supplies this information after deriving it from detection that light form a selected one of the light sources 16 to selected image positions has been intercepted, using less information than needed to select a position of the person or at least a most likely position in a likelihood as a function of position.

For this purpose, it may suffice to know a range of angles from the person at which a controllable light source is located (e.g. in a range from −45 to +45 degrees, in a range of 30 to 90 degrees, or in a range of 60 to 120 degrees etc.). If a distance between the person and the controllable light source is needed, a distance range may suffice. In an embodiment an approximate representation that is sufficient to derive such ranges is realized by dividing the space of possible positions of a person into a plurality of regions. For example, regions derived in terms of (possibly not accurately known) positions of controllable light sources 16 may be used.

Figure 6:
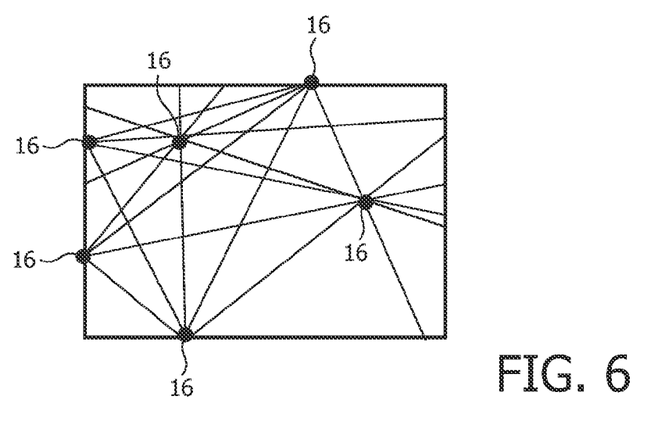
FIG. 6 shows a floor plan

FIG. 6 shows a division of a floor plan of a room into such regions. The boundaries between regions are selected based on lines radiating from different controllable light sources 16 to other controllable light sources 16. When there are large angles between such boundary lines, additional radiating lines from a controllable light source 16 may be added that do not run through other controllable light sources 16 and when the angles are small some boundary lines may be omitted. The information about the direction of the shadows can easily be used to discriminate between sets of such regions. This provides information of the position relative to the light sources, even if the positions of the light sources are not accurately known. Subsequently, image processor 12 may supply an indication of a region to control circuit 14, to control the lighting parameters. It should be appreciated that the floor plan is shown as a figure only as a matter of convenience for the reader. In practice processor 12 and control circuit 14 may represent the floor plan by means of equivalent information, such as identifications of points on the boundary lines etc.

Optionally, image processor 12 may also select a minimum distance of the shadow to the selected one of the controllable light sources 16. The minimum shadow distance signifies that the person must be closer to the selected one of the controllable light sources 16. This can be used to limit the number of areas of the floor plan in which the person can be present. The minimum distance may be selected for example by selecting pixel position in the image that is detected to lie in the shadow and lies closest to the selected one of the controllable light sources 16. Alternatively, a minimum distance may be selected that is greater than the distances of a predetermined fraction or a predetermined number of the points in the shadow. This is more robust against noise.

It should be noted that for the purpose of lighting control the locations of the controllable light sources 16 in the floor plan need not even correspond to exactly calibrated positions of the light sources 16. Also with approximate positions in the floor plan a sufficiently reliable indication of the positions may be realized for lighting control purposes. In many cases it suffices that the relative order in which a number of the controllable light sources 16 appear in the floor plan is known (i.e. the order in which they appear from left to right and top to bottom in the floor plan if there is more than a predetermined offset between the controllable light sources 16 in the left-right or top-bottom direction).

In a further embodiment a plurality of position determinations at different time points may be used. Thus a path followed by the person in the room can be tracked, or if a person stays in the same area, position information from different time points can be combined to obtain more accurate position estimates. By assigning less weight to measurements which indicate fast large scale motion, the effect of errors can be suppressed. In an embodiment position determination results obtained with an image for a preceding time point are used to provide an initial likelihood of the presence of the person in different areas in the room by spatially broadening (e.g. convoluting) the likelihoods determined for the preceding times. These initial likelihoods may then be narrowed down using direction information obtained from the image at the current time.

In second and third step 52, 53 a first and second image with mutually different lighting control settings where used. Different lighting conditions may be realized by switching a controllable light source to a different state and back before and after a short pulse interval wherein one of the images is captured. Preferably a pulse duration is used that makes the pulse invisible or hardly visible to the user. Thus a controllable light source 16 that is off may be temporarily switched on or vice versa. Alternatively, an intensity and/or spectral content may be varied.

To realize this embodiment control circuit 14 may be configured to apply such pulses and to provide a synchronization signal to image processor 12 in order to select the images. Alternatively, image processor 12 may select time points and signal control circuit 14 to vary the lighting properties. Image processor 12 or control circuit 14 may select successive controllable light sources 16 to which these pulses are applied. In another embodiment image processor may detect the time points of the pulses from the images. In this case no additional synchronization signal is needed.

However, in some cases pulses may be experienced as unpleasant by users. Due to the limitations of cameras a lower limit may have to be imposed on the pulse duration.

In an embodiment a light ambience selection with a more gradually varying lighting is used, for example with lighting properties that vary periodically with a period of more than one second with a continuous variation of the lighting properties or in small steps, such that the total variation amplitude requires a plurality of steps, say at least ten steps. In this embodiment control circuit 14 may provide a synchronization signal and an indication of the identity of the varying controllable light source 16 and its light intensity and its spectral content to image processor 12.

Furthermore, in another embodiment pixel positions that are illuminated and not illuminated by a controllable light source may be distinguished in other ways than used in second and third step 52, 53. In one embodiment, one of the first and second image may be captured at a time when the person is not in the room, or at least not at the position in the room that has to be determined. Pixel positions in the shadow may then be detected by comparing this image with an image captured when the person is in that position. In this case the lighting parameters of the selected one of the light sources need not even be changed.

In another embodiment image processor 12 is configured to detect points in the shadow for a controllable light source only from pixel positions that have been determined to light up strongly when illuminated by the selected one of the controllable light sources 16 in the absence of a person. Pixel positions may be selected for example by detecting whether pixel value at the pixel position responds more strongly to the selected one of the controllable light sources 16 than to other ones of the controllable light sources 16 absent a person.

In an embodiment image processor 12 computes a first predicted response to the selected one of the controllable light sources 16 absent a person at the setting of the lighting parameters. Furthermore image processor 12 computes a second predicted response to other ones of the controllable light sources 16 absent a person at the setting of the lighting parameters. Image processor 12 selects pixel positions where the first predicted response is larger than the second predicted response and selects a threshold for the position that lies between the first and second predicted response. Subsequently image processor 12 compares the actual response at the pixel location to the selected threshold, to detect a shadow if the response is below the threshold and illumination if the response is above the threshold. Use of only these selected pixel positions ensures that shadows are detected.

In a further embodiment image processor 12 may select a color component for which the first predicted response is larger than the second predicted response, or a combination of color components for which this holds, and image processor 12 may use that color component or combination of color components for the comparison. The color component or combination of color components may be selected individually for different pixel positions, so as to realize a maximum number of selected pixel positions or a common color component or combination of color components may be used that is selected for the selected one of the controllable light sources 16.

Figure 7:
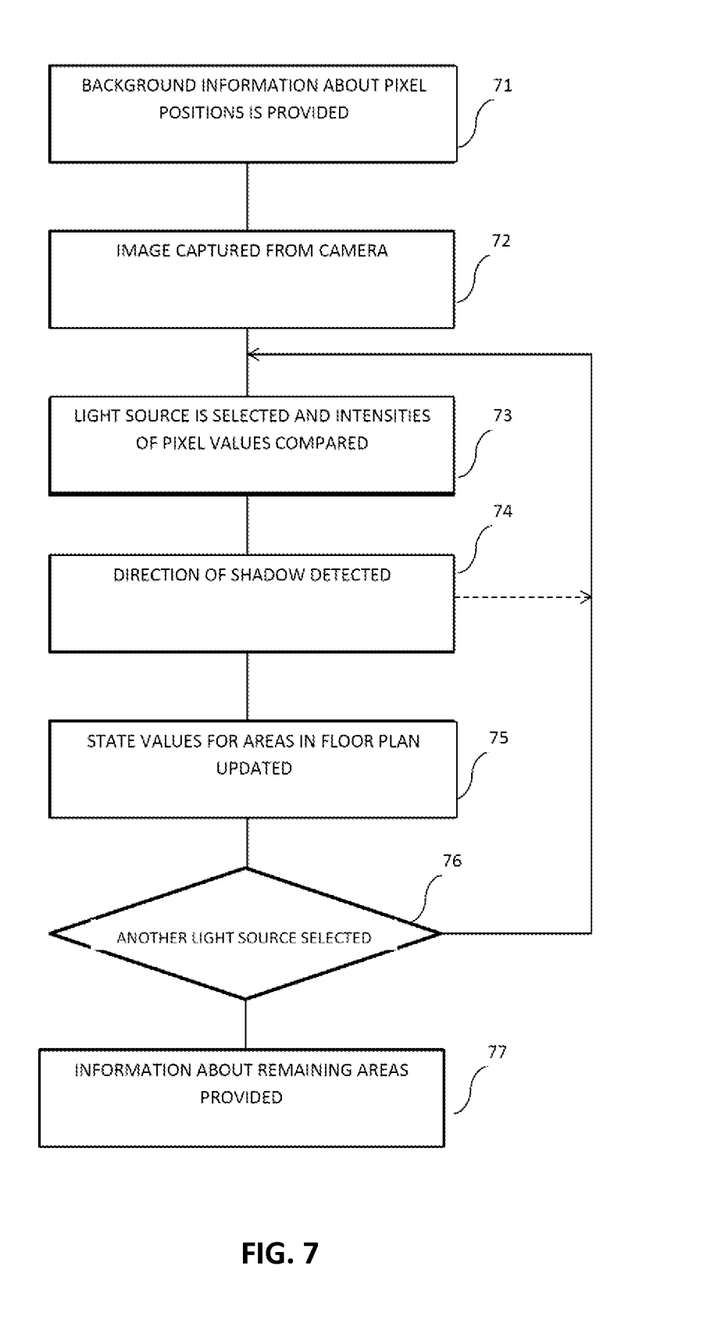
FIG. 7 shows a process for controlling lighting based on shadows

FIG. 7 shows a flow-chart of a process that makes use of these simplifications. In a first step 71, background information is provided about pixel positions. The background information may indicate groups of pixel positions to be used for respective ones of the controllable light sources 16. Furthermore the background information may define areas in a floor plan of the room. In a second step 72 image processor 12 captures an image from camera 10 at a time when a person may be in the room.

In a third step 73, image processor 12 selects one of the controllable light sources 16 that is on at the time of capturing the image and compares intensities of pixel values from the image at pixel positions in a group of pixel positions for the selected one of the controllable light sources 16 with threshold values. Relative threshold values may be used, determined relative to current intensity and color component of the controllable light sources. Alternatively preset threshold values may be used. The intensities may be overall intensities, intensities of color components or combinations of color components for example. Pixel positions from the group at which the intensities are below the threshold are assumed to lie in a shadow.

In an embodiment arbitrary selection of a controllable light source from a set of the controllable light sources 16 may be used to obtain the selected one of the controllable light sources 16, the steps of the process being repeated for other selections. In another embodiment the selection of the selected one of the controllable light sources 16 may restrict to one or more light sources that have groups of pixel positions where the contribution of such a light source to illumination dominates the contributions of all other light sources absent the person, at least under the current setting of lighting parameters. Such domination will be said to occur at least when the contribution of a light source is higher than the sum of all other contributions.

In a fourth step 74 image processor 12 derives a direction of the shadow from the pixel positions in the group of pixel positions that have been detected to lie in the shadow. This may be done for example by selecting a line in the image through an image position of the selected one of the light sources that best fits the pixel positions in the shadow. Optionally, image processor 12 may also select a minimum distance of the shadow to the selected one of the controllable light sources 16. If no shadow pixel positions are detected in the group, the process may return to third step 73 to select another one of the controllable light sources. Any number of light sources may be used, but for some purposes measurements using a single light source may be sufficient.

In a fifth step 75 image processor 12 uses the derived direction to update state values for the areas in the floor plan, marking areas that are inconsistent with this direction as containing no person. As shown in FIG. 6, the areas may be defined by boundary lines that radiate from the positions of controllable light sources 16. When image processor 12 has derived a direction from the selected one of the controllable light sources 16, areas between directions that differ more than a predetermined threshold from the derived direction may be marked as inconsistent with the position of the person. Instead likelihood values for different areas may be adapted dependent on the direction. Initially the marking of areas as consistent and inconsistent or likelihood values may be set to predetermined values (equal values or values accounting for obstructions) or the initial marking or likelihood values may be set based on position determination at previous time points, for example by broadening the set of areas that are marked as consistent at such time points. The minimum distance of the shadow to the selected one of the controllable light sources 16 may also be used to mark areas at a greater distance as inconsistent.

Although an embodiment has been shown wherein a relatively accurate direction measurement is used, sufficient to limit the position of the person to one sector, it should be appreciated that this is not necessary. A very coarse measurement may be used, which provides no more information than that the person is to the left or right of the selected one of the controllable light sources because the shadow from the person has a direction component running to the left or right respectively in the image, and/or that the person is in front of or behind the selected one of the controllable light sources because the shadow has a direction component away from the camera or towards the camera. This type of information can be used to reduce the area in the floor plan in which the position of the person can lie. Such a reduction by itself may provide sufficient information for the purpose of lighting control, or it may be combined with results for other selected ones of the controllable light sources to provide sufficient information.

In a sixth step 76, image processor 12 optionally branches back to repeat from third step 73 selecting another one of the controllable light sources 16. This may be repeated for all active controllable light sources 16 or for a selection of the controllable light sources 16. By using a plurality of active controllable light sources 16, the areas that are not inconsistent with the position of the person can be narrowed down to a single area or a limited number of areas. In a seventh step 77 image processor 12 provides information about the remaining area, or a representative position in the area to control circuit 14 for use in selection of the lighting parameters.

Although the flow chart shows a number of basic aspects, it should be appreciated that it leaves open various alternative embodiments. For example, a step may be added wherein image processor 12 detects a position of the person in the image and uses the detected position to update the information about the possibility of the presence of the person in the areas of the floor plan using this position. This may be done by using boundary lines between areas that radiate from the position of the camera in the floor plan. Instead of a floor plan with radiating lines a floor plan with tiles may be used, wherein areas between radiating lines may be mapped to tiles. Techniques to detect persons in images are known per se. A plurality of successively captured images may be used for example, using motion detection to find persons.

As another example, instead of marking areas as inconsistent or not inconsistent, image processor 12 may maintain likelihood values for the presence of the person in different areas, image processor 12 updating the likelihood values using the derived directions. This reduces the effects of erroneous measurements. The marking as inconsistent or not inconsistent or the likelihood values may be initialized to default values in second step 72 each time when a new image is processed, or an initial setting may be derived from previous images.

The selection of the group of pixel positions for a controllable light source 16 may be fixed, or it may be adapted to the setting of the lighting parameters when the image is captured, using response functions for pixel positions as described. In a further embodiment, the lighting parameters may be varied as a function of time and a plurality of images may be captured and compared to detect positions in the shadow.

Image processor 12 may be configured to collect background information for use in the process in advance. This may be done by capturing images with the camera for various settings of the lighting parameters in the course of time. From this information about the position of light sources may be collected, such as their coordinates in the image. Furthermore response functions of responses to controllable light sources may be collected for pixel positions. Image processing techniques such as segmentation may be used to identify the locations of objects such as the floor, furniture etc.

For many lighting control applications it suffices to know the position of a person. Lighting control may also depend on the direction in which the person looks. Lights may be controlled differently dependent on whether they are in the direction of looking or behind the person. For applications where the person must look at a television, this direction can be inferred without further measurement. In a further embodiment image recognition techniques may be used to detect the direction of looking and image processor 12 may be configured to signal the result to lighting control circuit 14.

Whereas the previous embodiments used the shadows cast by a person, in another embodiment image processor 12 is configured to use detection shadows on a person. Such shadows arise primarily because surfaces on the person are turned away from a controllable light source 16. More particularly, shadows on a person concerns direct illumination and absence of direct illumination by an individual controllable light source 16 on a person. The directions from the person to a controllable light source 16 and to camera 10 determine how much of pixel positions that show the person show such directly illuminated and not directly illuminated parts of the person.

Figure 8:
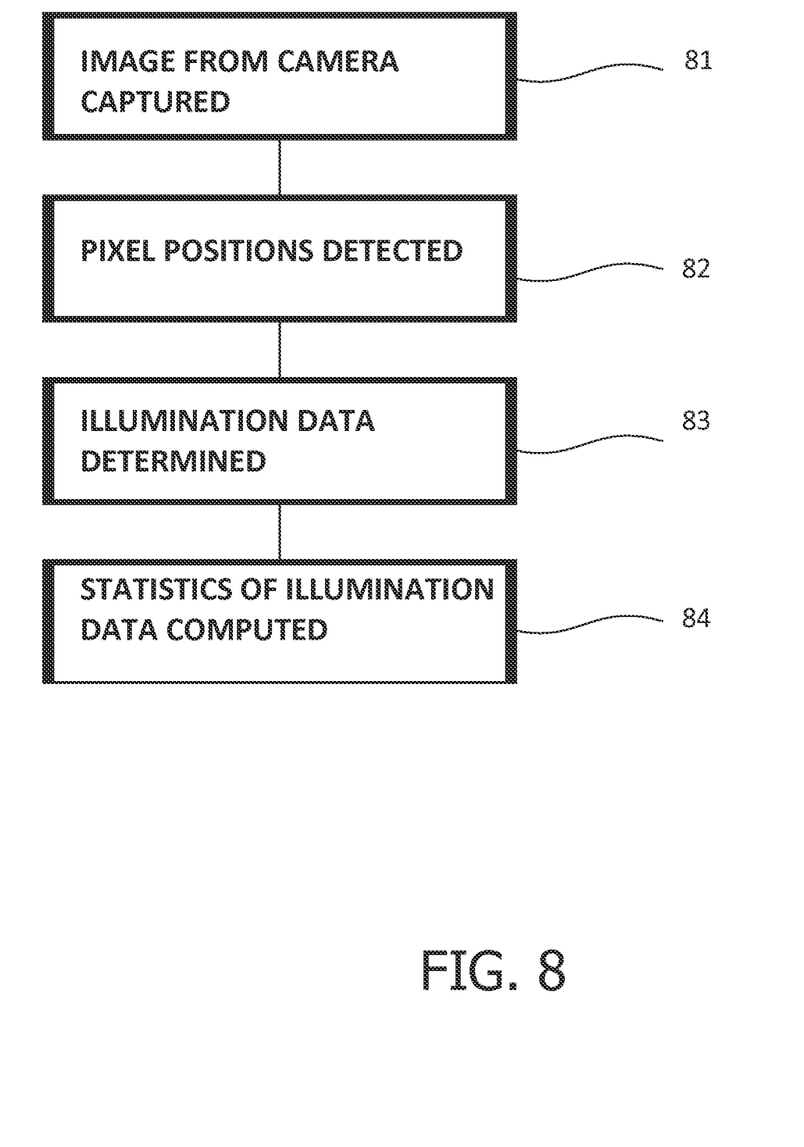
FIG. 8 shows a process for performing position updates

FIG. 8 shows a flow chart of a process to use shadows on a person to determine the position of the person. The aim of the flow chart is to determine the direction from a selected one of the light sources to the person. Conceptually, this direction is obtained using angles in a triangle formed by the person, the camera and a controllable light source, projected onto the floor plan. One of these angles follows from the position of the person in the image and another one is determined from shadows visible on the person.

In a first step 81 at least one image from camera 10 is captured. In a second step 82 image processor 12 detects a set of pixel positions that show a person, or a part of a person such as a face. Techniques to perform such detection are known per se. From a detected position of the person in the image direction image processor 12 may determine an angle of a projection onto the floor plan of the line from the camera 10 to the person. One of the angles of the aforementioned triangle, the angle between lines from the camera to the person and light source follows from this, given a predetermined known angle in the floor plan from camera 10 to a selected one of the controllable lighting sources 16.

In a third step 83, image processor 12 determines illumination data of the person at the pixel positions in this set for the selected one of the controllable light sources 16. As used herein, illumination data for a controllable light source 16 is descriptive of whether and optionally how strongly the controllable light source 16 contributes to illumination at a pixel position. In one embodiment the determination of illumination data merely involves a determination for each pixel that shows the person whether an illuminated part of the person is visible at respective pixel positions or not (and optionally whether neither one is sufficiently certain). In another embodiment illumination strengths may be determined. Techniques described in the preceding for detection of shadows cast by the person may be used for this.

In one embodiment, a difference may be computed between images obtained with mutually different parameter settings of the selected one of the controllable light sources 16 to determine the illumination strength. Optionally the difference may be divided by the size of the difference between the parameter settings to obtain a normalized illumination strength. As a further option this may be further divided by a response function for the part of the person that is visible at the pixel to obtain a further normalized illumination strength. Such a response function may be determined for example by applying image recognition techniques, which are known per se, to segment the image part that shows the person into segments with similar response functions (e.g. skin segments, hair segments), and using average response functions or a model of response functions to provide response functions for the pixel positions. In this way, normalized illumination strength may be obtained that is largely independent of reflection properties.

This embodiment and any of these options may be applied to the illumination strength of the overall intensity, or of intensity of color components or combinations of such intensities at a pixel position. Optionally, the illumination strength may be compared with a threshold to determine illumination data that indicates whether the pixel position shows direct illumination. This too may be done for overall intensity, for intensity of color components or combinations of such intensities.

When the selected one of the light sources 16 dominates lighting on the person, either because of its proximity or because of the uniqueness of its color content, this may suffice to distinguish illuminated and not illuminated parts, instead of using images obtained with different parameter settings. In an embodiment that uses this property, the determination of the illumination data comprises detecting whether the selected one of the controllable light sources dominates illumination of the person in the image and determining approximate illumination data from the image rather than from a difference. The domination may be detected from a distance of the image position of the detected person to a position of the light source for example, or from color of the illumination of the person, if the color is characteristic for a light source.

When image values rather than differences are used, the result may be normalized with a response function and lighting strength of the selected one of the controllable light sources 16 and/or compared with a threshold. As in the case of cast shadows, a response function for position on the person may be used to set the threshold value. In an embodiment, a detection may be made whether the image position of the person is detected to be within a predetermined distance of that of the selected one of the controllable light sources 16, by comparing the illumination (overall or of color components) with a threshold value.

In a fourth step 84, image processor 12 computes statistics of the illumination data for the set of pixel positions on the person (or selected part of the person such as a face). From this fraction image a second one of the angles in the aforementioned triangle person-camera-light source is determined. From this fraction image processor 12 computes an angle between directions from the person to the camera and the selected one of the controllable light sources 16. A lookup table with entries containing direction values for different values of the statistics may be used to translate the statistics into direction values. From this, the third angle of the triangle person-camera-light source can be determined, i.e. the angle between lines from the light source to the person and the camera. Given a predetermined known angle in the floor plan from camera 10 to a selected one of the controllable lighting sources 16, the direction of the person from the selected one of the controllable light sources follows from this.

From fourth step 84 the process may continue as from fifth step 75 of FIG. 7, by using the second direction to update position information, optionally repeating the process for other selected ones of the controllable light sources 16 and using the resulting position information to adjust the setting of the lighting parameters.

The statistics may be a fraction of pixel positions on the person (or part of the person such as a face) that is detected to be illuminated (a ratio between illuminated positions and total number of positions on the person or person part). Instead of fractions other statistical information about the degree of illumination may be used as entry to the tables. Moments may be used (averages of multinomials of x and y weighted by illumination data e.g. ($<x>$, $<y>$. $<x^2>$ $<xy>$ etc.). A series of values of average illumination strength as a function of horizontal position in the part of the image that shows the person may be used for example (averaged in the vertical direction). The position of an edge in such a series, indicating the transition from direct illumination to shadow relative to the edges of the person, may be determined and used to look up the direction.

The use of a lookup table to convert such statistics to direction information is only one example of an embodiment. The lookup table represents a model of the person that relates the fraction of direct illumination to direction to the light source. In an embodiment image processor 12 may be configured to determine lookup table values in a learning phase by measuring values of the statistics at known angles of the person relative to a light source. Alternatively model based values may be used in the table. Instead of a lookup table other lookup techniques may be used, such as a function that expresses the relation between the statistics and angle.

In another example segmentation of the pixel positions that show the person into directly illuminated and not directly illuminated segments may be used. In this case the number of illuminated segments may be used to look up an angle.

In a further embodiment image processor 12 may be configured to capture a series of successive images from camera 10 and to determine changes of the fraction, the statistical information or the number of segments as a function of time. From these changes, image processor 12 may determine the direction of change in depth of the person to update the position of the person in the floor plan.

Although examples have been given of the determination of position in the floor plan, it should be appreciated that similar techniques may be used for determining vertical positions. Shadows cast at higher and lower positions than the person may be used for this, or shadows higher up and lower down on the person.

In the application to lighting ambience control, the double use of the controllable light sources that are used to create the lighting ambience also for position determination makes it possible to create a lighting system with powerful control possibilities and little overhead. However, although the application to control of the lighting ambience has been described, it should be realized that the resulting position estimates may be used for other purposes as well. For example, the position information could be used to control a set of audio sources to create a stereo sound image that corresponds to the detected position.

Image processor 12 may be a programmable computer circuit, configured by providing it with a program to cause it to perform the functions as described. Instead a dedicated processor may be used, with circuits configured to do so. Control circuit 14 may also be implemented as a programmable computer circuit, configured by providing it with a program to cause it to perform the functions as described, or by means of a dedicated circuit. In an embodiment image processor 12 and control circuit 14 may be implemented in a single computer. Image processor 12 and control circuit 14 may be implemented in a computer or computer that also performs other functions such as game control, video decoding etc.

Although embodiments have been described wherein information about the position of a person is determined, it should be appreciated that similar techniques may be applied to determine the positions of other types of object. Preferably use is made of objects that can readily be recognized in images.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling lighting of a space by means of a plurality of controllable light sources, wherein said controlling depends on a position of an object in the space relative to the controllable light sources, the method comprising:
   receiving an image of at least part of said space;
   detecting from said image whether light from a selected one of the controllable light sources to points in said space shown at respective image positions in said image has been intercepted by the object;
   determining information indicative of a direction of the intercepting object relative to the selected one of the controllable light sources from the respective image positions where the light has been detected to be intercepted;
   updating position information that indicates a position of the object in said space, according to the direction determined from the respective image positions where the light has been detected to be intercepted;
   enabling to adjust a lighting parameter setting of the controllable light sources dependent on the updated position information;
   detecting a position of the object in the image; and
   updating the position information using a combination of the detected position of the object and the direction determined from the respective image positions where the light has been detected to be intercepted.

2. A method according to claim 1, comprising
   computing information representing a direction of a line through an image position corresponding to a position of the selected one of the controllable light sources to the respective image positions where the light has been detected to be intercepted and
   determining the information indicative of a direction of the intercepting object relative to the selected one of the controllable light sources from the information representing the direction of said line.

3. A method according to claim 1 comprising detecting image positions in the image that show the object and selecting the respective image positions only from the image positions that show the object.

4. A method according to claim 3, comprising computing statistics of the respective image positions and determining the direction from said statistics.

5. A method according to claim 1 comprising representing the position information by means of information that presence or absence of the object in a predetermined set of areas of a floor plan, the areas having boundary lines that radiate from positions of the controllable light sources in the floor plan.

6. A method according to claim 1, wherein said adjusting comprises receiving a selection of a desired light ambience, which specifies light properties dependent on direction relative to the object and setting lighting parameters of the controllable light sources, according to the received selection of the light ambience, dependent on the updated position.

7. A method according to claim 1, wherein said adjusting comprises setting lighting parameters of a further one of the controllable light sources dependent on the position information obtained using said selected one of the controllable light sources.

8. A method according to claim 1, wherein said detecting comprises comparing pixel values from the image with reference values for the respective image positions.

9. A method according to claim 8, comprising determining the reference values dependent on the selected one of the controllable light sources.

10. A method according to claim 8, comprising
changing the lighting parameters of the selected one of the controllable light sources,
capturing a further image, the selected one of the controllable light sources having mutually different lighting parameters at times of capturing the image and the further image respectively;
computing differences between image values in the image and the further image and
performing said detecting by comparing the differences for the respective image positions with reference values.

11. A method according to claim 1, comprising selecting the selected one of the controllable light sources dependent on a determination whether its contribution to lighting dominates over contributions of other ones of the controllable light sources at the respective pixel positions at least absent interception of light by the object.

12. A lighting system comprising
control circuit having an output for controlling intensity and/or spectral content of a plurality of controllable light sources, the control circuit being configured to adjust the intensity and/or spectral content dependent on position information indicative of a position of a object relative to the controllable light sources;
an image processing circuit with an input for receiving images from an image sensor, and an output for supplying the position information to the control circuit, the processing circuit being configured to detect in an image from said image sensor whether light from a selected one of the controllable light sources to points shown at respective image positions in said image has been temporarily intercepted by an object, to determine information indicative of a direction of the intercepting object relative to the selected one of the controllable light sources from the respective image positions where the light has been detected to be intercepted, and to update the position information according to the direction determined from the respective image positions where the light has been detected to be intercepted, wherein the image processing circuit is further configured for computing information representing a direction of a line through an image position corresponding to a position of the selected one of the controllable light sources to the respective image positions where the light has been detected to be intercepted, and for determining the information indicative of a direction of the intercepting object relative to the selected one of the controllable light sources from the information representing the direction of said line.

13. An image processing device comprising an input unit for receiving images from an image sensor, and an output unit for outputting position information indicative of a position of a object relative to controllable light sources, the device being configured for detecting in an image from said image sensor whether light from a selected one of the controllable light sources to points shown at respective image positions in said image has been temporarily intercepted by an object, wherein the detecting includes comparing pixel values from the image with reference values for the respective image positions, for determining information indicative of a direction of the intercepting object relative to the selected one of the controllable light sources from the respective image positions where the light has been detected to be intercepted, and for updating the position information according to the direction determined from the respective image positions where the light has been detected to be intercepted, wherein the image processing device is further configured for
changing the lighting parameters of the selected one of the controllable light sources,
capturing a further image, the selected one of the controllable light sources having mutually different lighting parameters at times of capturing the image and the further image respectively;
computing differences between image values in the image and the further image; and
performing said detecting by comparing the differences for the respective image positions with reference values.

* * * * *